(12) United States Patent
Nebel et al.

(10) Patent No.: US 9,771,025 B1
(45) Date of Patent: Sep. 26, 2017

(54) STOWABLE STAIR CARRIER WITH LIFT ASSIST MECHANISM

(71) Applicant: LIPPERT COMPONENTS, INC., Elkhart, IN (US)

(72) Inventors: Michael W. Nebel, Smith Center, KS (US); Nathaniel Fuller, Granger, IN (US); Shawn Gray, Middlebury, IN (US); Jeremiah Bradley, Nappanee, IN (US); Jeffrey Albrecht, Goshen, IN (US); Dominick Bilancio, Elkhart, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 0 days.

(21) Appl. No.: 15/461,915

(22) Filed: Mar. 17, 2017

Related U.S. Application Data

(60) Provisional application No. 62/351,613, filed on Jun. 17, 2016.

(51) Int. Cl.
*B60R 3/02* (2006.01)

(52) U.S. Cl.
CPC .................... *B60R 3/02* (2013.01)

(58) Field of Classification Search
CPC .. B60R 3/00; B60R 3/007; B60R 3/02; B61D 23/02; B61D 23/025; E06C 5/02; E06C 5/04; E06C 5/06
See application file for complete search history.

(56) References Cited

U.S. PATENT DOCUMENTS

| | | | |
|---|---|---|---|
| 1,542,775 A | | 6/1925 | Husted |
| 2,037,805 A | * | 4/1936 | Lindstedt ............... B61D 23/02 105/447 |
| 2,951,454 A | * | 9/1960 | Candlin, Jr. ........... B61D 23/02 105/447 |
| 2,960,182 A | | 11/1960 | Swanson |
| 2,990,148 A | | 6/1961 | James |
| 3,137,763 A | | 6/1964 | Jones |
| 3,176,334 A | * | 4/1965 | Lovdahl .................. B60R 3/02 14/71.1 |
| 3,750,737 A | | 8/1973 | Woodward |
| 3,853,369 A | | 12/1974 | Holden |
| 3,955,827 A | | 5/1976 | Wonigar |
| 3,997,211 A | | 12/1976 | Graves |
| 4,014,486 A | | 3/1977 | Nelson et al. |
| 4,084,713 A | * | 4/1978 | Rohrs ....................... B60P 1/43 14/69.5 |
| 4,161,769 A | | 7/1979 | Elliott |

(Continued)

*Primary Examiner* — Frank B Vanaman
(74) *Attorney, Agent, or Firm* — Barnes & Thornburg LLP

(57) ABSTRACT

A system includes a structure having a wall, a doorway and a door that is repositionable between a first position wherein the door is clear of the doorway and a second position wherein the door occludes the doorway. The system also includes a stair carrier attached to the structure. A stair may be connected to the stair carrier. The stair carrier is repositionable between a first position wherein the entirety of the stair carrier is disposed on a first side of the wall and a second position wherein a portion of the stair carrier extends through the doorway to a second side of the wall. The door is fully operable between the first position and the second position both when the stair carrier is in the first position and in the second position.

8 Claims, 8 Drawing Sheets

(56) References Cited

U.S. PATENT DOCUMENTS

| | | | |
|---|---|---|---|
| 4,161,997 A * | 7/1979 | Norman | E06C 5/00 |
| | | | 182/127 |
| 4,394,718 A | 7/1983 | Balzer | |
| 4,425,984 A | 1/1984 | Lachance | |
| 4,456,095 A | 6/1984 | Hodson | |
| 5,028,063 A | 7/1991 | Andrews | |
| 5,085,290 A | 2/1992 | Guirlinger | |
| 5,117,940 A | 6/1992 | Garelick | |
| 5,228,707 A * | 7/1993 | Yoder | B60R 3/02 |
| | | | 182/127 |
| 5,397,143 A | 3/1995 | Bird | |
| 6,135,526 A | 10/2000 | Reckner, Jr. | |
| 6,425,572 B1 | 7/2002 | Lehr | |
| 6,612,596 B2 | 9/2003 | Jeon et al. | |
| 7,055,838 B2 | 6/2006 | Lambie | |
| 8,162,273 B2 | 4/2012 | Jones | |
| 8,573,673 B1 * | 11/2013 | Puglisi, Sr. | E06C 5/02 |
| | | | 182/127 |
| 8,720,643 B1 | 5/2014 | Adair | |
| 2008/0022611 A1 | 1/2008 | Bird | |
| 2008/0210338 A1 | 9/2008 | Ponce | |
| 2009/0273154 A1 | 11/2009 | Kuula | |
| 2010/0251926 A1 * | 10/2010 | Tomada | B61D 19/023 |
| | | | 105/447 |
| 2014/0345974 A1 | 11/2014 | Nebel et al. | |

* cited by examiner

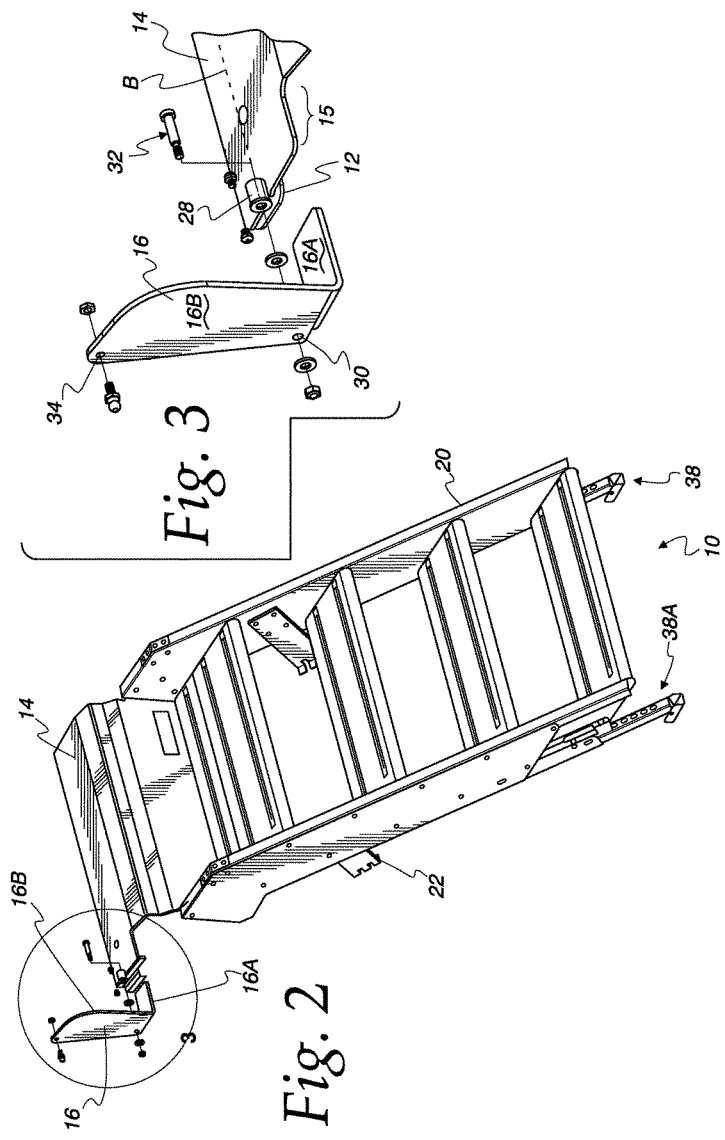

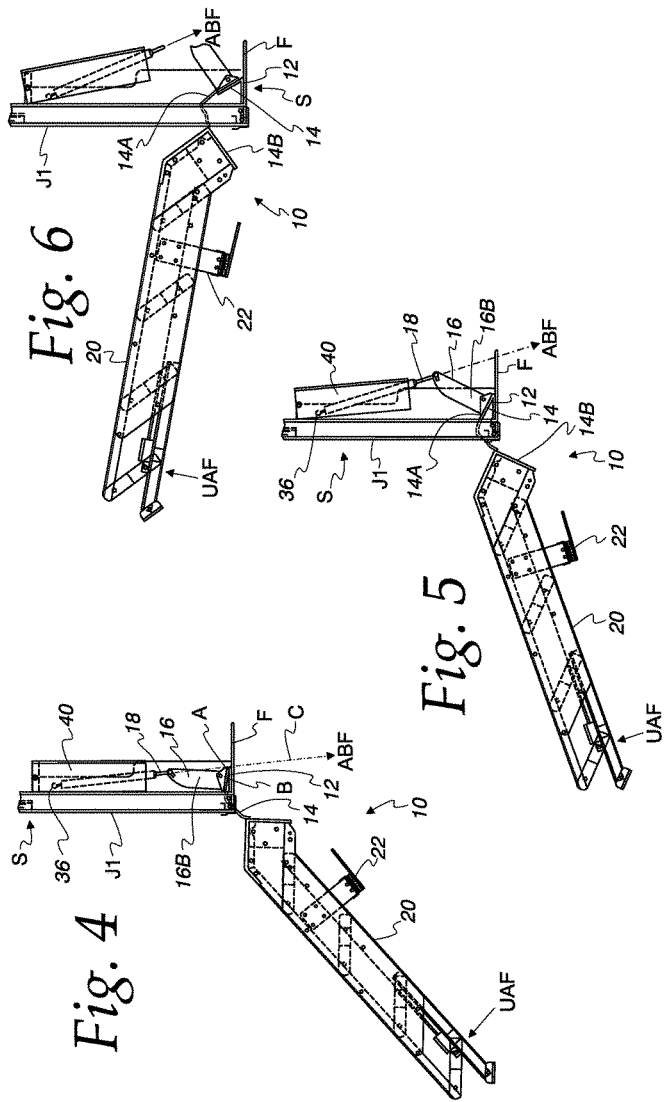

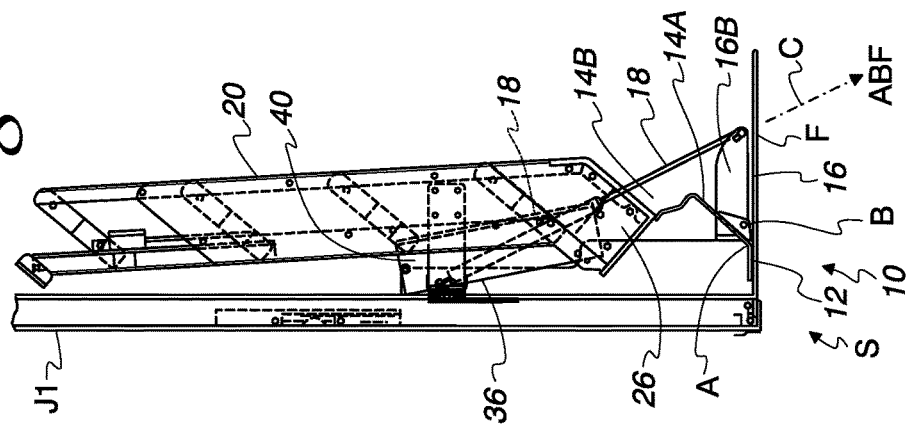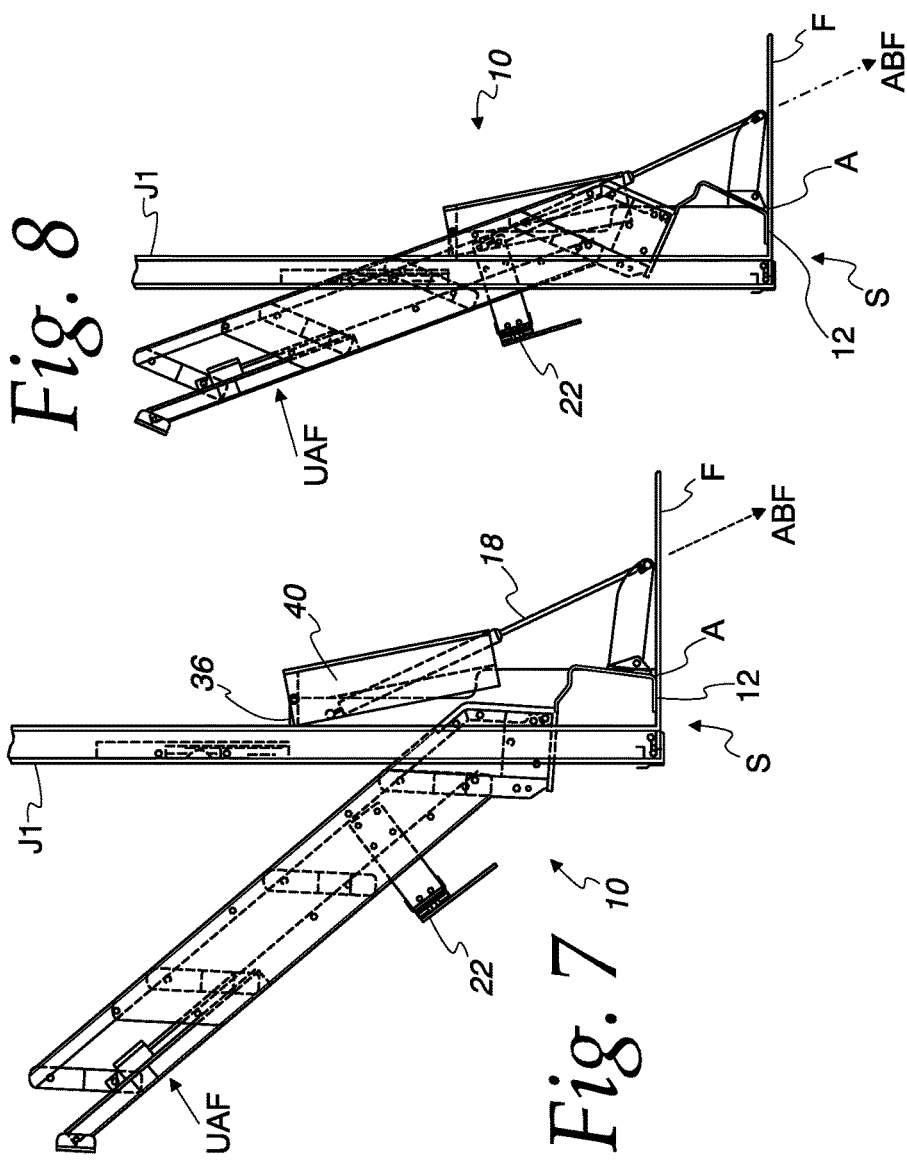

STOWABLE STAIR CARRIER WITH LIFT ASSIST MECHANISM

CROSS REFERENCE TO RELATED APPLICATION

This application claims benefit under 35 U.S.C. §119 of U.S. Provisional Patent Application No. 62/351,613, filed on Jun. 17, 2016, the disclosure of which is incorporated herein by reference in its entirety.

BACKGROUND AND SUMMARY OF THE DISCLOSURE

A mobile structure, for example, a recreational vehicle (RV) or trailer, or other structure may include an interior space defined, in part, by a floor and a wall having a first (or inner) side and a second (or outer) side. The wall may include a doorway through which a user may pass to enter and exit the interior space. The doorway may include a header, a threshold (or sill), and first and second jambs extending between the header and the threshold. A door may be pivotally attached to the first jamb and latchable to the second jamb. The door may be pivotable between a first (or open) position in which the door is substantially clear of the doorway, thereby readily allowing passage therethrough, and a second (or closed) position in which the door substantially occupies or closes or occludes the doorway, thereby precluding passage therethrough. The door and/or doorway may include one or more of seals and a sweep configured to effectively seal a gap between the door and the doorway.

The floor may be positioned a substantial distance above the ground upon which the structure is situated. As such, the mobile structure may be provided with stairs to better enable passage between the floor and the ground. In order to avoid interference with the environment when the mobile structure is in transit, the stairs typically are collapsible or removable. Conventional collapsible stairs typically require under-floor space to receive the collapsed stair carrier, thereby limiting possible stair locations and, consequently, possible door locations. Removable stairs can be awkward to manipulate and require storage space when removed.

The present disclosure is directed to a stowable stair carrier for use in connection with an entry door and doorway of a mobile structure or other structure. The stowable stair carrier is configured for attachment to the structure entirely within the interior space thereof. The stowable stair carrier is repositionable between a first (or stowed) position wherein the entirety of the stair carrier is located within the interior space and a second (or deployed) position wherein a first portion of the stair carrier is located within the interior space and another portion of the stair carrier extends through the doorway and is thus located outside the interior space. The stowable stair carrier is configured so that the door is fully operable between the open and closed positions when the stair carrier is in the stowed position and also when the stair carrier is in the deployed position.

BRIEF DESCRIPTION OF THE DRAWINGS

FIG. 2 is a partially exploded perspective view of a stowable stair carrier according to the present disclosure;

FIG. 3 is a detail view of a stowable stair carrier according to the present disclosure;

FIG. 4 is a side elevation view of a stowable stair carrier according to the present disclosure installed in a structure and in a fully deployed position;

FIG. 5 is a side elevation view of a stowable stair carrier according to the present disclosure installed in a structure and in a partially deployed position;

FIG. 6 is a side elevation view of a stowable stair carrier according to the present disclosure installed in a structure and in another partially deployed position;

FIG. 7 is a side elevation view of a stowable stair carrier according to the present disclosure installed in a structure and in yet another partially deployed position;

FIG. 8 is a side elevation view of a stowable stair carrier according to the present disclosure installed in a structure and in still another partially deployed position;

FIG. 9 is a side elevation view of a stowable stair carrier according to the present disclosure installed in a structure and in a stowed position;

DETAILED DESCRIPTION OF THE DRAWINGS

Figure 1:
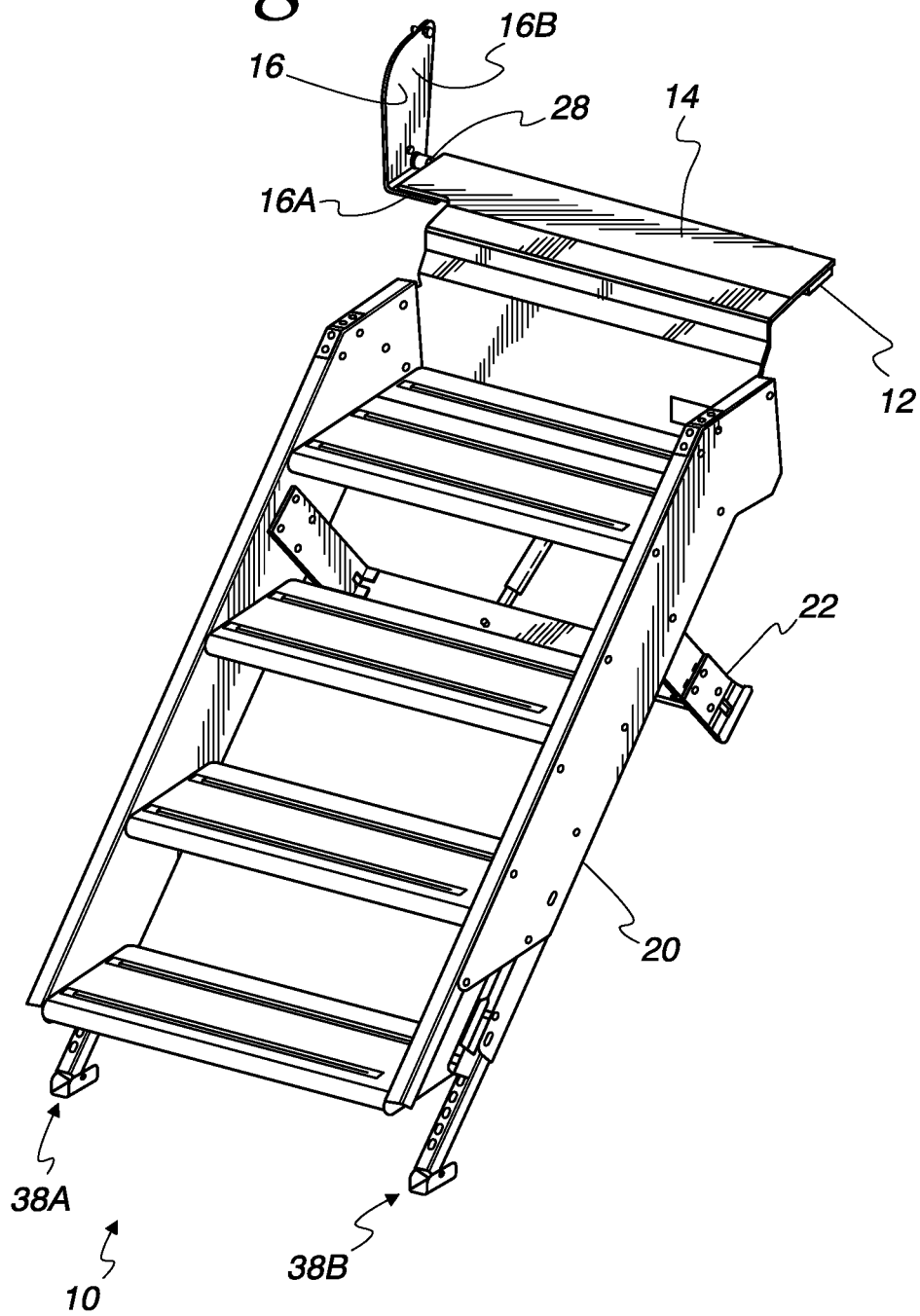
FIG. 1 is a perspective view of a stowable stair carrier according to the present disclosure.
Figure 10:
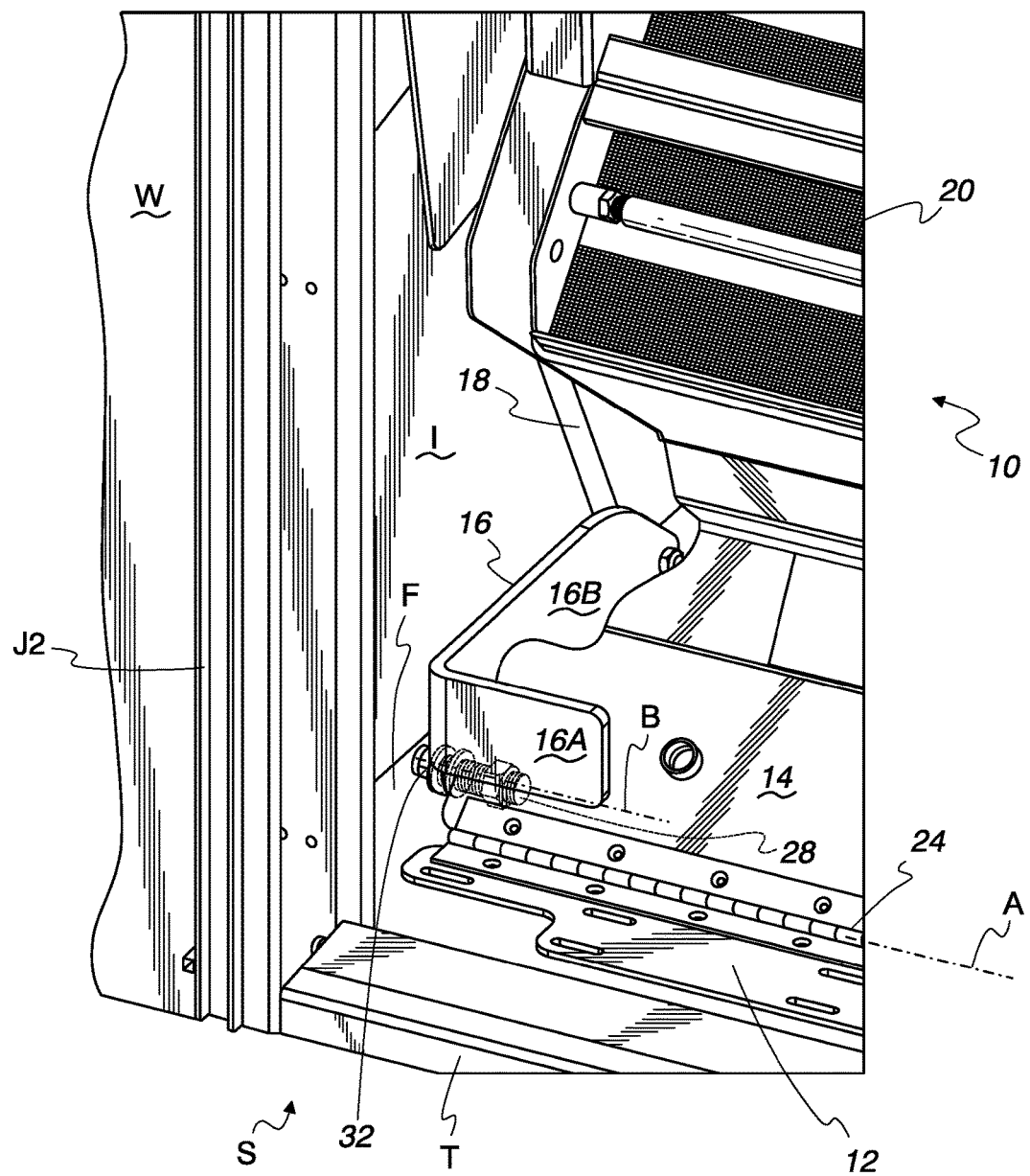
FIG. 10 is a detail perspective view of a portion of a stowable stair carrier according to the present disclosure installed in a structure and in a stowed position.
Figure 11:
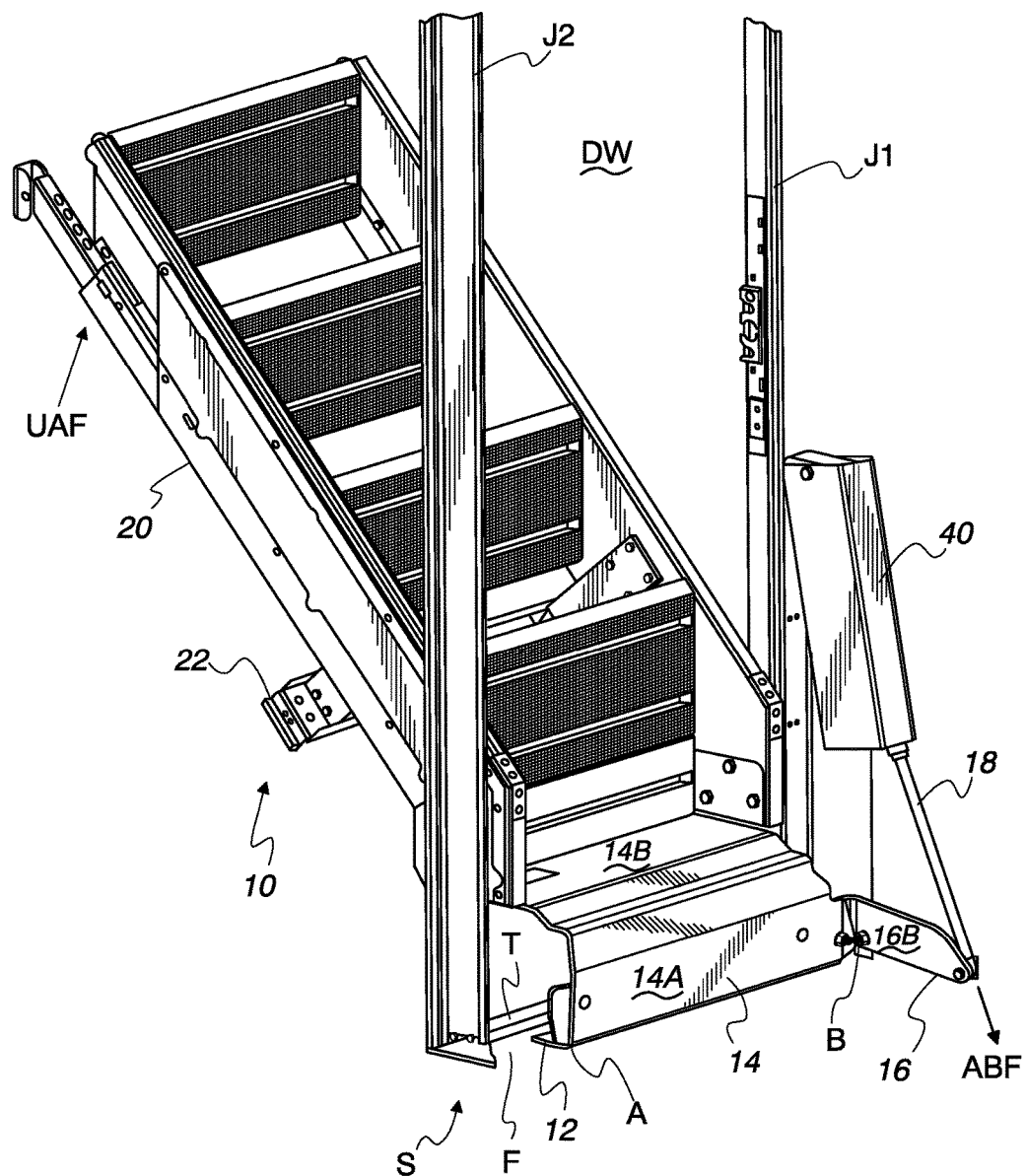
FIG. 11 is a perspective view of a portion of a stowable stair carrier according to the present disclosure installed in a structure and in a further partially deployed position.
Figure 14:
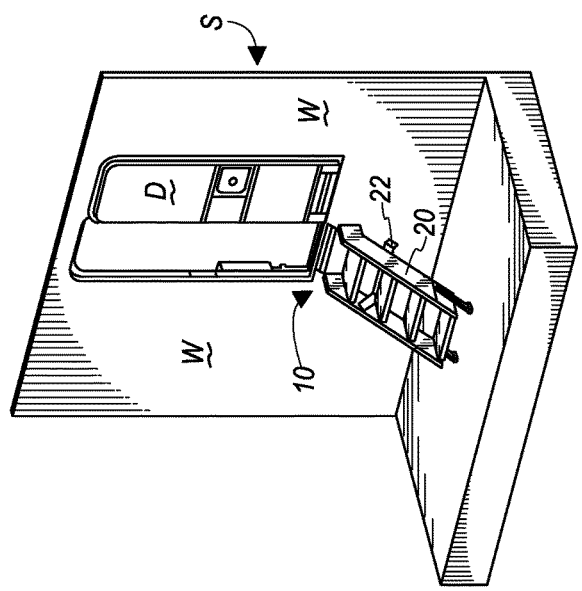
FIG. 14 is a perspective view of a structure in which a stowable stair carrier according to the present disclosure is installed and fully deployed, the structure having a wall defining a doorway and a door selectively occluding the doorway, with the door in a fully open position.
Figure 13:
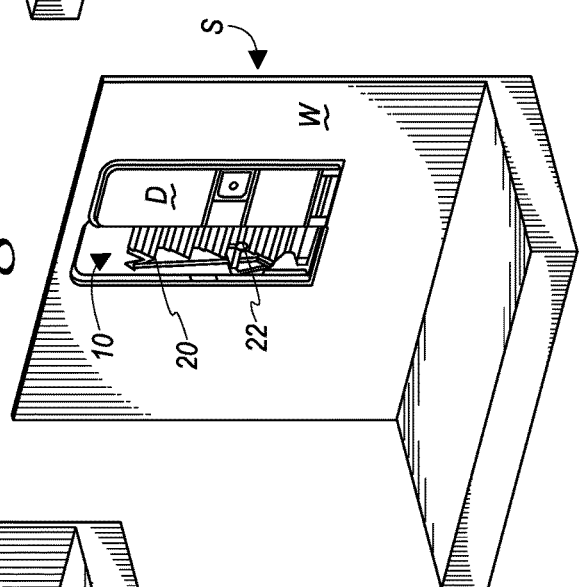
FIG. 13 is a perspective view of a structure in which a stowable stair carrier according to the present disclosure is installed and stowed, the structure having a wall defining a doorway and a door selectively occluding the doorway, with the door in a fully open position.
Figure 12:
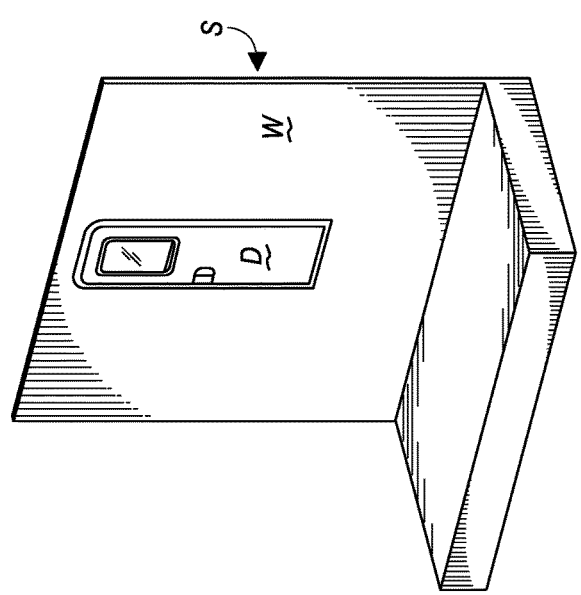
FIG. 12 is a perspective view of a structure in which a stowable stair carrier according to the present disclosure is installed and stowed, the structure having a wall defining a doorway and a door selectively occluding the doorway, with the door in a closed position.
Figure 15:
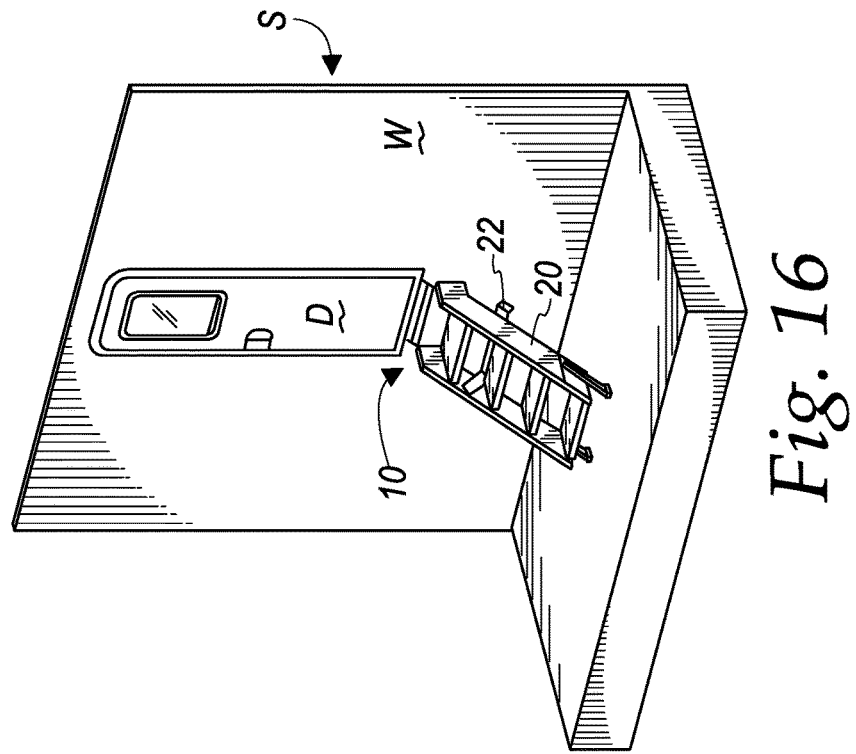
FIG. 15 is a perspective view of a structure in which a stowable stair carrier according to the present disclosure is installed and fully deployed, the structure having a wall defining a doorway and a door selectively occluding the doorway, with the door in a partially open position.
Figure 16:
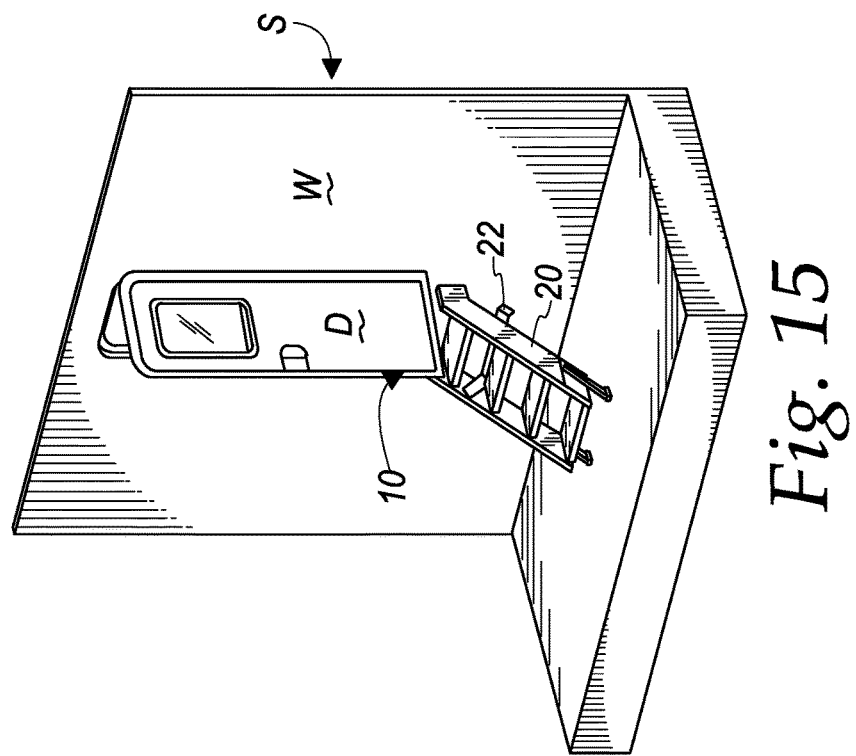
FIG. 16 is a perspective view of a structure in which a stowable stair carrier according to the present disclosure is installed and fully deployed, the structure having a wall defining a doorway and a door selectively occluding the doorway, with the door in a fully closed position.

The drawings show an illustrative embodiment of a stowable stair carrier 10 according to the present disclosure. As suggested above and best shown in FIGS. 4-16, the stowable stair carrier 10 is configured for installation and use in connection with a structure S, for example, a mobile structure as discussed above. The structure S may have a floor F and a wall W cooperating to define an interior space I. The wall W may include a doorway DW having a header H, a threshold (or sill) T, and first and second jambs J1, J2 extending between the header and the threshold. A door D may be pivotally attached to the first jamb J1 and latchable to the second jamb J2. The door D may be pivotable between a first (or open) position in which the door is substantially clear of the doorway DW, thereby readily allowing passage therethrough, and a second (or closed) position in which the door substantially occupies or closes or occludes the doorway, thereby precluding passage therethrough. The door D and/or doorway DW may include one or more of seals and a sweep (not shown) configured to effectively seal a gap between the door and the doorway.

The stowable stair carrier 10 is configured for attachment to the structure S entirely within the interior space I thereof. The stowable stair carrier 10 is repositionable between a first (or stowed) position wherein the entirety of the stair carrier is located within the interior space I and a second (or deployed) position wherein a first portion of the stair carrier is located within the interior space and another portion of the stair carrier extends through the doorway DW and is thus located outside the interior space. The stowable stair carrier 10 is configured so that the door D is fully operable between the open and closed positions when the stair carrier is in the stowed position and also when the stair carrier is in the deployed position.

As shown, the stowable stair carrier 10 includes a base plate (or mounting plate) 12, a threshold plate 14 pivotally connected to the base plate, a lift bracket 16 pivotally connected to the threshold plate, and an actuator 18 pivotally connected to the lift bracket. The stowable stair carrier 10 may also include a stair 20 connected to the threshold plate 14, and a latch mechanism 22 connected to the stair.

The base plate 12 is shown as an elongated, generally flat, rectangular member. The base plate 12 is configured for attachment to the structure, for example, to the floor F of the structure, on the first side of the wall and adjacent the doorway. The base plate 10 may define one or more mounting holes configured to receive fasteners, for example, screws or other mechanical fasteners that may be used to secure the base plate to the structure.

As suggested above, the threshold plate 14 is pivotally connected to the base plate 12 by a first hinge 24. The first hinge 24 defines a first pivot axis A. The first hinge 24 is shown as a single, continuous hinge (or piano hinge). In other embodiments, the first hinge 24 could be embodied in other ways, for example, as two or more discrete hinges. The threshold plate 14 is pivotable about the first hinge 24 and axis A with respect to the base plate 20 between a first (or stowed) position and a second (or deployed) position, as discussed above and as will be discussed further below.

The threshold plate 14 includes a first portion 14A extending at a first end from the first hinge 24. The first portion 14A is configured to extend from the inner side of the wall of the structure to the outer side of the wall and to overlie the threshold of the structure when the threshold plate 14 is in the deployed position. The first portion 14A may also be configured to overlie the base plate 12 when in the threshold plate 14 is in the deployed position. The threshold of the structure may be higher than the base plate 12 and/or the floor F of the structure. The first portion 14A may be formed to generally follow the contour of the threshold T, the floor F of the structure, and/or the base plate 12 in close proximity thereto when the threshold plate 14 is in the deployed position.

The threshold plate 14 includes a second portion 14B extending from a second end of the first portion 14A. As shown, the second portion 14B extends in a direction generally perpendicular to the first portion 14A. First and second stair attachment brackets in the form of first and second tabs 26 extend generally perpendicularly from the second portion 14B of the threshold plate 14. The first and second tabs 26 are configured for attachment to the stair 20, as will be discussed further below. Each of the first and second tabs 26 defines a plurality of holes therethrough for receiving fasteners that may be used to attach the stair 20 to the tabs. Other embodiments may include different interfaces for connecting the stair 20 to the threshold plate 14.

The first portion 14A of the threshold plate 14 includes a second hinge 28. The second hinge 28 defines a second pivot axis B spaced from and parallel to the pivot axis A. The second hinge 28 could be formed monolithically with the threshold plate 14 or provided as a separate component, post-attached thereto. As shown, the second hinge 28 is embodied as a boss (for example, a tube, sleeve or bushing) connected to the first portion 14A of the threshold plate 14.

The second hinge 28 is located at or near a side edge of the first portion 14A of the threshold plate 14. The first portion 14A of the threshold plate 14 may include an extension 15 extending laterally therefrom. In such an embodiment, the extension 15 may include the second hinge 28. In any event, the second hinge 28 may be located so as to intrude at most minimally into the first portion 14A of the threshold plate 14 from or near a side edge thereof.

The lift bracket 16 is pivotally connected to the threshold plate 14 by the second hinge 28. The lift bracket 16 includes a first (or lift or engagement) portion 16A having a first surface selectively engageable in abutment with a facing surface of the first portion 14A of the threshold plate 14. The lift bracket 16 includes a second (or cam or lever) portion 16B generally perpendicular to the first portion 16A. The second portion 16B defines a first aperture 30 configured to receive a pivot pin 32 extending through the pivot boss 28, the pivot pin 32 in pivotal engagement with either or both of the first aperture 30 and the pivot boss 28. The second portion 16B also defines a second aperture 34 configured for pivotal engagement with the actuator 18, as will be discussed further below.

The actuator 18 is shown as a linear (or telescopic) actuator having a first end, a second end, and an actuator axis C. The actuator 18 may be, for example, a gas strut or a compression spring disposed within a tube. The actuator 18 is biased towards an extended position. An external force may applied to the ends of the actuator 18 to compress the actuator to a retracted position.

As suggested above, the first end of the actuator 18 may be pivotally connected to the second aperture 34 of the lift bracket 16. The second end of the actuator 18 may be pivotally connected to an actuator mounting bracket 36. The actuator mounting bracket 36 is configured for attachment to the interior of the structure, for example to the inner side of one of the door jambs J1, J2 or to the inner side of the wall of the structure adjacent the doorway DW, as will be discussed further below.

The stair 20 may be embodied in any suitable way and attached to the threshold plate as discussed above or in another suitable manner. For example, as shown, the stair 20 may include first and second stringers and one or more steps or treads extending fixedly between the first and second stringers. The first and second stringers may be connected at first (or upper) ends thereof to the first and second tabs 26, respectively. In another embodiment, the stair 20 may be a collapsible stair, for example, as disclosed in U.S. Provisional Patent Application No. 62/351,613, referenced above.

A foot may be attached fixedly or telescopically to each or both of the first and second stringers at or proximate second (or lower) ends thereof. As shown, a first foot 38A is telescopically attached to the first stringer, and a second foot 38B is telescopically attached to the second stringer. The length of each of the first foot 38A and the second foot 38B can be adjusted independently from the other of the first foot and the second foot to accommodate uneven terrain underneath the lower end of the stair 20. In another embodiment, one or more feet may be attached to a lowermost step of the stair 20. Such a foot may be, for example, a self-leveling foot as disclosed in U.S. Provisional Patent Application No. 62/351,613, referenced above.

The stowable stair carrier 10 may be installed to the structure S as follows. The base plate 12 may be mounted to the floor F of the structure S adjacent the doorway DW so that the threshold plate 14 (and the stair 20 if attached thereto) may be selectively pivoted about the first hinge 24 with respect to the base plate and through the doorway. Typically, the base plate 12 would be mounted to the floor F with the first and second pivot axes A, B parallel to the threshold T of the door. As shown in the drawings, the base plate 12 may be attached to the floor F so that the threshold plate 14 overlies the base plate when the stair carrier 10 is in the deployed position. Alternatively, the base plate 12 may be attached to the floor F so that the base plate and the threshold plate 14 are generally side-by-side when the stair carrier 10 is in the deployed position.

The actuator mounting bracket 36 may be attached to a jamb J1, J2 of the doorway DW or to an inner side of the wall W of the structure S adjacent the doorway. Typically, though not necessarily, the actuator mounting bracket 36 would be located such that the actuator 18 may be pivotally connected to the actuator mounting bracket 36 and to the lift bracket 16 so that the actuator axis C is generally perpendicular to the first and second pivot axes A, B. Typically, the base plate 12 and the actuator mounting bracket 36 would be mounted to the structure so that the actuator axis C intersects the floor F at a position further from the wall W than the first pivot axis A throughout the entire range of motion of the actuator 18, the lift bracket 16, and the threshold plate 14, as will be discussed further below. Also, the base plate 12 and the actuator mounting bracket 36 may be mounted to the structure so that the actuator axis C never is perpendicular to one or more of the floor F, the base plate 12, or the first portion 14A of the threshold plate 14.

In any event, the actuator mounting bracket 36 typically would be installed to the structure so that the actuator 18 is substantially extended when the stair carrier 10 is in the stowed position and substantially compressed when the stair carrier is in the deployed position. As such, the actuator 18 generally biases the stair carrier 10 to or toward the stowed position.

A shroud 40 may be provided and installed to the structure in a manner that at least partially conceals the actuator 18 and/or the actuator mounting bracket 36 when those components are installed to the structure as discussed above. For example, the shroud 40 may be fixedly or pivotally attached to the wall of the structure proximate the attachment of the actuator mounting bracket 36 to the structure.

In an embodiment, the threshold plate 14, the second hinge 28, the lift bracket 16 and the base plate 12 are configured so that the first portion 16A of the lift bracket and the base plate do not interfere with each other when the threshold plate 14 is in the first position, the second position, or at any position between the first position and the second position. For example, the first portion 16A of the lift bracket 16 and the base plate 12 may lie spaced apart from each other and side-by-side when the threshold plate 14 is in the deployed position with respect to the base plate.

As best shown in FIG. 9, with the stowable stair carrier 10 installed to the structure as discussed above and in the stowed position, the entirety of the stair carrier, including without limitation the base plate 12, the threshold plate 14, the lift bracket 16, the actuator 18, the actuator mounting bracket 36, and the stair 20 may be located within the interior space I of the structure, and the door may be opened and closed and placed in any intermediate position between opened and closed without interference from any portion of the stair carrier 10.

As best shown in FIG. 4, with the stowable stair carrier 10 installed to the structure as discussed above and in the deployed position, the first portion 14A of the threshold plate extends from the first hinge 24 inside the structure to a point outside the structure, and the second portion 14B of the threshold plate (and the stair, if attached thereto) is entirely outside the structure. With the stowable stair carrier 10 in the deployed position, the door may be freely opened and closed and placed in any intermediate position between opened and closed without interference from any portion of the stair carrier 10 (except for possible interaction of a sweep or seal at the bottom of the door with an upper surface of the threshold plate 14, which interaction does not preclude normal operation of the door).

FIGS. 4-9 show the transition of the stowable stair carrier 10 from the deployed position to the stowed position. FIG. 4 shows the stowable stair in the fully deployed position. In this position, the actuator 18 is substantially compressed, and it applies an actuator biasing force ABF to the lift bracket 16. A component of the actuator biasing force ABF is spaced from and normal to the second pivot axis B. As such, the actuator biasing force ABF working through the lever portion 16B of the lift bracket 16 creates a moment about the second pivot axis B, thereby biasing the lift bracket 16 rotationally about the second pivot axis B with respect to the threshold plate 14, thereby causing the first portion 16A of the lift bracket 16 to engage with the facing surface of the first portion 14A of the threshold plate. Also, a component of the actuator biasing force ABF is spaced from and normal to the first pivot axis A. As such, the actuator biasing force ABF working through the lift bracket 16 and the threshold plate 14 creates a moment about the first pivot axis A, thereby biasing the threshold plate 14 about the pivot axis A toward the stowed position.

With the stair 20 attached to the stair carrier 10, the actuator biasing force ABF alone is insufficient to move the stair carrier from the fully deployed position toward the stowed position. As such, a user must apply an additional user applied force UAF to the stair carrier 10 to initiate repositioning from the deployed portion toward the stowed position. In an embodiment, this user applied force UAF may be about 15 pounds applied to the bottom of the stair 20 normal to the plane of the stair. Application of the UAF causes the threshold plate 14 to begin to rotate about the first pivot axis A. The actuator biasing force ABF maintains the first portion 16A of the lift bracket 16 in engagement with threshold plate 14 and provides a portion of the overall force required to move the stair carrier 10 from the deployed position to the stowed position.

As best shown in FIG. 5, as the stair carrier 10 begins to reposition from the deployed position toward the stowed position, the component of the actuator basing force ABF normal to the first pivot axis A and the second pivot axis B becomes spaced further from the first and second pivot axes, thereby increasing the moments created about the first and second pivot axes, thereby increasing the force contributed by the actuator to the overall force required to further transition the stair carrier 10 toward the stowed position, and thereby decreasing the user applied force UAF necessary to further transition the stair carrier toward the stowed position. In an embodiment, the additional force necessary to further transition the stair carrier 10 toward the stowed position from the position shown in FIG. 5 may be about 6 pounds applied to the bottom of the stair 20 normal to the plane of the stair.

As best shown in FIG. 6, as the stair carrier 10 continues to reposition from the deployed position toward the stowed position, the component of actuator axis C normal to the first and second pivot axes A, B moves still further from the respective first pivot axes, thereby further increasing the moments created about the first and second pivot axes, and thereby further decreasing the user applied force UAF necessary to further transition the stair carrier 10 toward the stowed position. In an embodiment, the additional force necessary to further transition the stair carrier 10 toward the stowed position from the position shown in FIG. 6 may be about negative 1 pound applied to the bottom of the stair 20 normal to the plane of the stair. Put another way, once the stair carrier 10 has rotated to the position shown in FIG. 6, the stair carrier may continue to rotate solely in response to the actuator biasing force ABF and without any additional force applied by the user.

As best shown in FIG. 7, as the stair carrier 10 further continues to reposition from the deployed position toward the stowed position, the component of the actuator biasing force ABF normal to the first and second pivot axes A, B moves still further from the first and second pivot axes, thereby further increasing the moments created about the first and second pivot axes, and thereby further decreasing the additional force necessary to further transition the stair carrier 10 toward the stowed position. In an embodiment, the additional force necessary to further transition the stair carrier 10 toward the stowed position from the position shown in FIG. 7 may be about negative 5 pound applied to the bottom of the stair 20 normal to the plane of the stair. Put another way, once the stair carrier 10 has rotated to the position shown in FIG. 7, the stair carrier may continue to rotate based solely on the actuator force and without any additional force applied by the user.

As best shown in FIG. 8, with the actuator 18 fully extended, the actuator biasing force is sufficient to maintain the stair carrier 10 with stair 20 attached thereto in an elevated position. In this state, the lever portion 16B of the lift bracket 16 has rotated toward the floor F of the structure, but it does not contact the floor of the structure.

In order to fully stow the stair carrier 10 from the position shown in FIG. 8, a user may apply an additional force normal to the stair to further rotate the threshold plate 14 in the stowed direction. In response, the threshold plate 14 will rotate with respect to the base plate 12 and the lift bracket 16. Also, the lift bracket 16 may incidentally rotate with respect to the second end of the actuator 18, away from the floor F. With the stair 20 fully moved to the stowed position, the latch may engage with the door jamb or other structure attached to the door jamb or the wall of the structure to releasably secure the stair in the stowed position.

The stair carrier 10 may be transitioned from the stowed position to the deployed position by unlatching the latch 22 attached to the stair 20 from the jamb or other structure and reversing the foregoing process. Initially, the stair 20 and threshold plate 14 will rotate toward engagement of the threshold plate with the lift bracket 16. Up until this point, the actuator 18 provides no biasing force to the stair carrier 10. Once the threshold plate 14 is engaged with the lift bracket 16, the actuator biasing force ABF initially supports the stair carrier 10 in a partially stowed position, as shown in FIG. 8. In order to further transition the stair carrier 10 toward the deployed position, a user may apply a downward force (opposite to the force UAF shown in FIG. 8) normal to the plane of the stair 20. As the stair carrier 10 rotates toward the deployed position, the weight of the stair 20 eventually will overcome the actuator biasing force ABF, and the user may drop the stair to the ground or apply an upward force to gently lower the stair to the ground.

The stowable stair carrier 10 may be installed to the structure S without modification to the floor F, wall W, or doorway DW (except for drilling holes as may be necessary to fasten the base plate 12 and the actuator mounting bracket 36 to the structure). For example, neither the floor F nor the threshold T of the structure S needs to be cut, sectioned, or otherwise modified to accommodate the stair carrier 10.

Although the stair carrier 10 is discussed and shown for use in combination with a mobile structure, the stair carrier could be used in combination with a fixed structure.

The foregoing drawings and description are illustrative and not limiting. The invention disclosed herein is limited solely by the appended claims.

The invention claimed is:

1. A system comprising:
a structure having a floor and a wall, the wall defining a doorway having a threshold, a first jamb extending upwardly from the threshold, and a second jamb extending upwardly from the threshold, the second jamb spaced from the first jamb, and the structure having a door pivotally connected to the first jamb and selectively latchable to the second jamb, the door selectively repositionable between a first door position in which the door is clear of the door way and a second door position in which the door occludes the doorway;
a stair carrier having a base plate attached to the floor and a threshold plate pivotally connected to the base plate along a first pivot axis, the threshold plate repositionable between a first threshold plate position in which the entirety of the threshold plate is located on the same side of the wall as the base plate, and a second threshold plate position in which a first portion of the threshold plate is located on the same side of the wall as the base plate and a second portion of the threshold plate extends over the threshold and through the doorway; and
a stair connected to the threshold plate and movable therewith between a first stair position in which the stair is on the same side of the wall as the base plate and a second stair position in which the stair is on the opposite side of the wall as the base plate;
wherein the door is operable between the first door position and the second door position both when the threshold plate and the stair are in the respective first threshold plate and first stair positions and when the threshold plate and the stair are in the respective second threshold plate and second stair positions.

2. The system of claim 1, wherein the stair carrier further comprises a lift bracket pivotally connected to the threshold plate along a second pivot axis, the second pivot axis spaced from and parallel to the first pivot axis, the lift bracket configured to selectively engage the threshold plate in abutting engagement.

3. The system of claim 2 further comprising an actuator pivotally connected to the lift bracket and to the structure, the actuator having an actuator axis intersecting the floor further from the wall than the first pivot axis and the second pivot axis.

4. The system of claim 3 further comprising an actuator configured to impart an actuator biasing force to the lift bracket, the actuator biasing force biasing the lift bracket toward engagement with the threshold plate.

5. The system of claim 4 wherein the actuator is a linear actuator connected between the lift bracket and the structure.

6. The system of claim 5 wherein the linear actuator has an actuator axis intersecting the floor further from the wall than the first pivot axis and the second pivot axis.

7. The system of claim 1 wherein the threshold plate does not penetrate the threshold or the floor of the structure when the threshold plate is in the second threshold plate position.

8. The system of claim 1 wherein the stair does not penetrate the threshold or the floor of the structure when the stair is in the second stair position.

* * * * *